United States Patent
Kondo et al.

(10) Patent No.: US 8,169,635 B2
(45) Date of Patent: May 1, 2012

(54) NETWORK PRINTING SYSTEM CAPABLE OF PRINTING A WEB PAGE

(75) Inventors: Yoshiyuki Kondo, Okazaki (JP); Yuji Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1101 days.

(21) Appl. No.: 10/778,540

(22) Filed: Feb. 17, 2004

(65) Prior Publication Data

US 2004/0160636 A1    Aug. 19, 2004

(30) Foreign Application Priority Data

Feb. 19, 2003 (JP) ................................. 2003-041723

(51) Int. Cl.
*G06F 3/12* (2006.01)
*G06F 15/16* (2006.01)

(52) U.S. Cl. ........................ 358/1.15; 709/202; 709/203

(58) Field of Classification Search ................ 358/1.15, 358/1.16; 709/219; 370/401
See application file for complete search history.

(56) References Cited

U.S. PATENT DOCUMENTS

| | | | |
|---|---|---|---|
| 6,184,996 B1 * | 2/2001 | Gase ............................ | 358/1.15 |
| 6,453,129 B1 * | 9/2002 | Simpson et al. ................ | 399/23 |
| 6,633,548 B2 * | 10/2003 | Bachmutsky et al. ........ | 370/255 |
| 6,681,246 B1 * | 1/2004 | Dutta ............................ | 709/206 |
| 6,765,920 B1 * | 7/2004 | Tari et al. ..................... | 370/401 |
| 6,795,205 B1 * | 9/2004 | Gacek .......................... | 358/1.15 |
| 7,002,703 B2 * | 2/2006 | Parry ............................ | 358/1.15 |
| 7,010,604 B1 * | 3/2006 | Munger et al. ................ | 709/227 |
| 7,154,891 B1 * | 12/2006 | Callon .......................... | 370/392 |
| 7,274,474 B2 * | 9/2007 | Yamaguchi et al. ......... | 358/1.15 |
| 2002/0039148 A1 | 4/2002 | Yamamoto | |
| 2002/0091652 A1 * | 7/2002 | Nagahara ...................... | 705/400 |
| 2003/0002072 A1 * | 1/2003 | Berkema et al. ............. | 358/1.15 |
| 2003/0123079 A1 | 7/2003 | Yamaguchi et al. | |
| 2003/0125967 A1 * | 7/2003 | Josephsen et al. ................ | 705/1 |

FOREIGN PATENT DOCUMENTS

| | | |
|---|---|---|
| JP | A-11-355496 | 12/1999 |
| JP | A-2001-184180 | 7/2001 |
| JP | A-2001-222481 | 8/2001 |
| JP | A-2003-46981 | 2/2003 |

OTHER PUBLICATIONS

Laser Internet Technology. Series No. 8 Data Exchange Control from Server: CDF (Channel Definition Format), Internet Magazine Aug. 1997.

* cited by examiner

*Primary Examiner* — Vincent Rudolph

(74) *Attorney, Agent, or Firm* — Oliff & Berridge, PLC

(57) ABSTRACT

When a user desires to periodically subscript a certain Web page (to automatically print the Web page), the user makes access to a sign-up page of the desired Web page by using a PC, via a facsimile machine. When the user clicks an "OK" button on the sign-up page, a setting request is transmitted to a Web server through the facsimile machine. In response to the setting request, the Web server sends back a data packet including an HTML document with a comment tag including periodical subscription setting data, as a response to the user. The transmitted periodical subscription setting data is received by the facsimile machine. When receiving the response, the facsimile machine determines whether a receiver's IP address and port number included in the data packet have been registered in the facsimile machine. When the IP address and port number are included, the facsimile machine extracts the periodical subscription setting data from the data packet and the setting of periodical subscription is performed therein based on the periodical subscription setting data.

23 Claims, 18 Drawing Sheets

SUBSCRIPTION INFORMATION ENTRY TABLE

| DAY | TIME | URL | SUBSCRIBER |
|---|---|---|---|
| SUNDAY | 20:00 | http://www.syuukantenki.・・・ | PC13(IP=・・・) |
| 1ST OF MONTH | 9:00 | http://www.gekkan-tenki.・・・ | PC14(IP=・・・) |
| ⋮ | ⋮ | ⋮ | ⋮ |

FIG.3

SUBSCRIPTION INFORMATION ENTRY TABLE

| DAY | TIME | URL | SUBSCRIBER |
|---|---|---|---|
| SUNDAY | 20:00 | http://www.syuukantenki.···· | PC13 (IP=···) |
| 1ST OF MONTH | 9:00 | http://www.gekkan-tenki.···· | PC14 (IP=···) |
| ······ | ······ | ······ | ······ |

FIG.5A
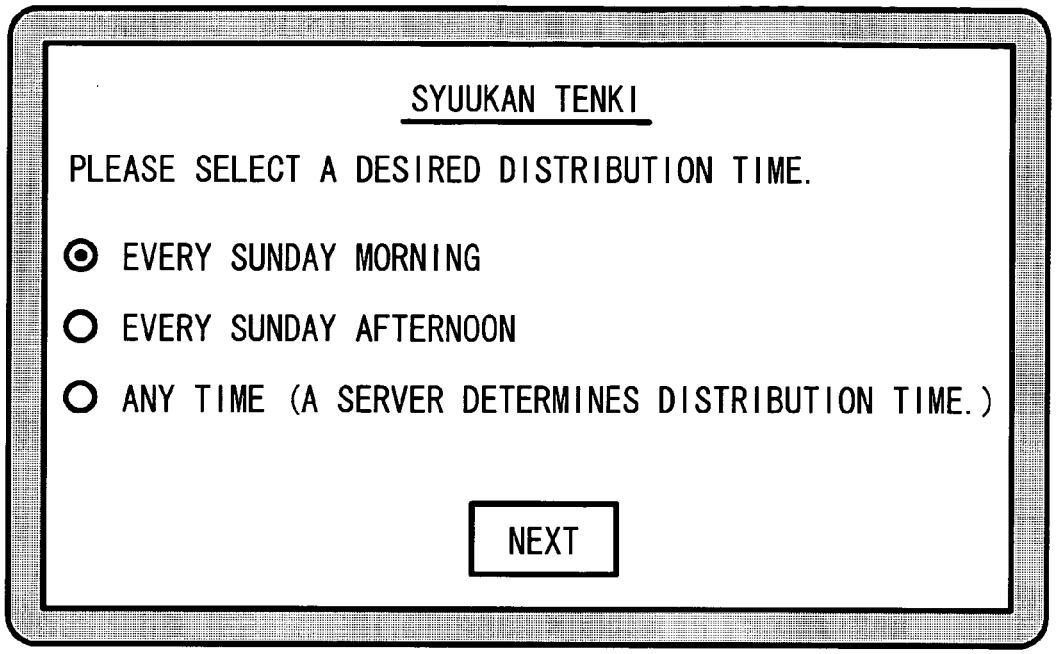
FIG.5B
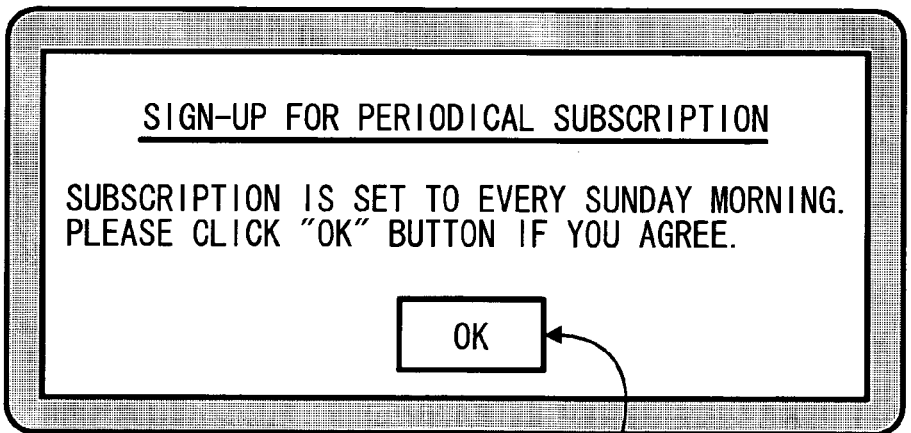

FIG.5C

| TRANSMITTER IP:A | TRANSMITTER IP:Q | ...... | TRANSMITTER'S PORT 8000 | TRANSMITTER'S PORT 100 | ...... | HTTP REQUEST (SETTING REQUEST) | ...... |

FIG.6A

RESPONSE FROM WEB SERVER (HTML)

```
<HTML>
<!--  ##WebPrintSetting:D=SUN:T=09:00:
URL=http://syuukantenki/##-->
<BODY>
<PALIGN=CENTER>
<H2>THANK YOU VERY MUCH FOR YOUR SIGN-UP
    FOR PERIODICAL SUBSCRIPTION.
</H2>
</P>

THE SETTING HAS BEEN COMPLETED TO PRINT
THE WEB PAGE OF "http.//syuukantenki/"
EVERY SUNDAY MORNING.

WE HOPE TO KEEP YOU AS A CUSTOMER
OF THE WEB PAGE, "SYUUKAN TENKI",
FOR A LONG TIME.
</BODY>
</HTML>
```

PERIODICAL SUBSCRIPTION SETTING DATA (COMMENT TAG)

FIG.6B

| TRANSMITTER IP:Q | TRANSMITTER IP:G | ... | TRANSMITTER'S PORT 100 | TRANSMITTER'S PORT 4000 | ... | PERIODICAL SUBSCRIPTION SETTING DATA | ... |

SUBSCRIPTION TIME SETTING TABLE

| SUBSCRIPTION TIME | NUMBER OF SUBSCRIBERS |
|---|---|
| SUNDAY – 9:00 | 123 |
| SUNDAY – 9:05 | 123 |
| SUNDAY – 9:10 | 122 |
| SUNDAY – 9:15 | 122 |
| ... | ... |
| SUNDAY – 9:55 | 122 |

SCANNING POSITION

FIG.12

DATA FILE FOR SIGN-UP CONFIRMATION SCREEN (HTML)

```
<HTML>
<!-- %%Setting%% -->
<BODY>
<PALIGN=CENTER>
<H2>THANK YOU VERY MUCH FOR YOUR SIGN-UP
    FOR PERIODICAL SUBSCRIPTION.
</H2>
</P>

THE SETTING HAS BEEN COMPLETED TO PRINT THE
WEB PAGE OF "http.//syuukantenki/" EVERY
SUNDAY MORNING.

WE HOPE TO KEEP YOU AS A CUSTOMER OF THE
WEB PAGE, "SYUUKAN TENKI", FOR A LONG TIME.
</BODY>
</HTML>
```

NETWORK PRINTING SYSTEM CAPABLE OF PRINTING A WEB PAGE

BACKGROUND OF THE INVENTION

1. Field of Invention

The invention relates to a network printing system, a Web server, a printing apparatus and a program which constitutes the above network printing system.

2. Description of Related Art

There exists a printing apparatus having a so-called Web printing function wherein the printing apparatus obtains and prints a desired Web page by automatically accessing a Web server in accordance with preset data that periodically subscribes to the desired Web page. More specifically, U.S. patent application Publication No. US2003/0123079 discloses a printer wherein a user enters, in advance with the printer, a URL of a Web server where HTML (Hyper Text Markup Language) data of a desired Web page to be periodically subscribed is located. An access day and time when access is to be made to the URL is stored in advance in the printer. With this presetting in the printer, when the predetermined access day and time are reached, the printer automatically establishes a connection with the Web server, based on the URL, to obtain the desired Web page in order to print the contents of the page on a recording medium.

Conventionally, for example, the settings of peripheral equipment, such as printers and routers, have been performed through a Web browser equipped in a terminal, such as a personal computer (PC). When the settings of the peripheral equipment can be performed as described above, the user can set the peripheral equipment in much the same way the user views a Web page of the Internet. Thus, it is conceivable that the setting of data for automatic printing in a printer could be performed through a Web browser of a PC by connecting the PC to the printer having the above Web printing function.

However, it is burdensome for the user to enter all of the data (e.g., a URL of a Web page and an access day and time) necessary for automatic printing directly into the printing apparatus or through the Web browser of the PC. In particular, when a user who is unskilled in handling a PC and is unaccustomed to inputting data has a facsimile machine having a Web printing function, it is difficult for the user to input necessary data for automatic printing. The user may not be able to fully use the facsimile machine to execute the Web printing function.

SUMMARY OF THE INVENTION

The invention thus provides, among other things, a technique that easily accomplishes a setting for automatic printing by a Web printing function without troublesome operations for a user.

According to one exemplary aspect of the invention, a network printing system includes a Web server, and a printing apparatus that is bidirectionally communicably connected with the Web server via a network and performs printing onto a recording medium by obtaining a Web page from the Web server in accordance with a predetermined page obtaining data, wherein a setting of the page obtaining data performed in the printing apparatus is conducted in accordance with setting data to be transmitted from the Web server to the printing apparatus in response to a setting request transmitted from the printing apparatus to the Web server.

According to the network printing system constructed as described above, the printing apparatus in the network system has a so-called Web printing function for automatically obtaining and printing a desired Web page at a predetermined day and time. Therefore, the only thing the user has to do is to perform an operation so that the printing apparatus transmits the setting request. The Web server, which received the setting request, transmits setting data in accordance with the request to the printing apparatus to allow the printing apparatus to automatically set the page obtaining data by itself in accordance with the received setting data. Therefore, the setting of automatic printing by a Web printing function can be easily performed without bothering the user.

BRIEF DESCRIPTION OF THE DRAWINGS

Embodiments of the invention will be described in detail with reference to the following figures wherein:

FIG. 3 is a subscription information entry table stored in a RAM of a Web printing unit;

FIG. 5A shows a distribution time selecting screen to be displayed on a display of the PC when an sign-up operation for periodical subscription is performed through the PC;

FIG. 5B shows a periodical subscription sign-up screen to be displayed on the display of the PC and an HTTP request to be transmitted to the Web server;

FIG. 5C shows a data packet including the HTTP request;

FIG. 6A shows periodical subscription setting data (an HTTP response) to be transmitted to the PC from the Web server;

FIG. 6B shows a data packet including the HTTP response;

FIG. 12 shows a data file for a sign-up confirmation screen prestored in the Web server;

DETAILED DESCRIPTION OF PREFERRED EMBODIMENTS

Figure 1:
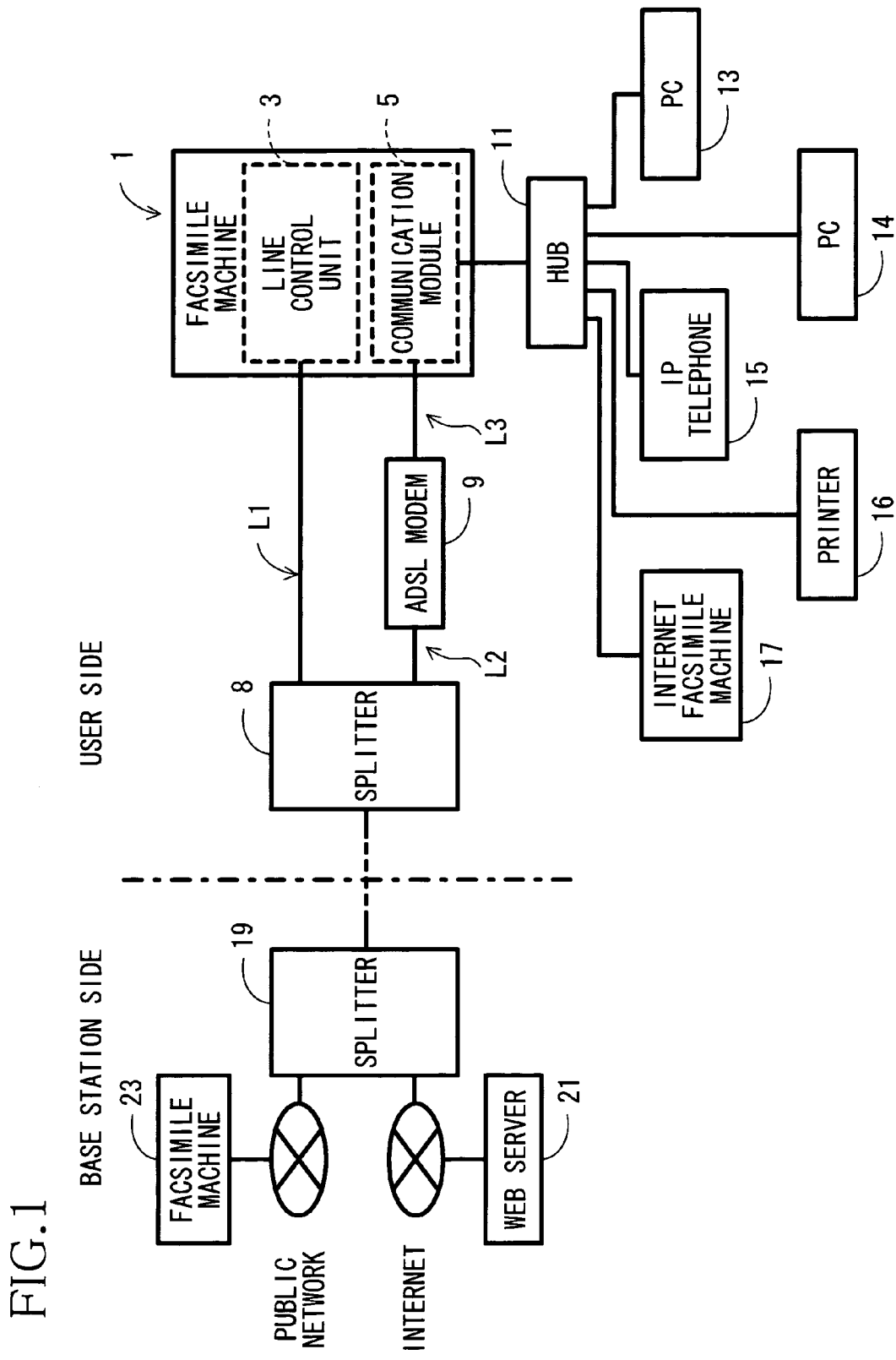
FIG. 1 is a schematic structure of a network printing system of an embodiment of the invention.

Embodiments of the invention will be described with reference to the accompanying drawings. A first embodiment will be now described. As shown in FIG. 1, a network printing system of the first embodiment is constructed such that a facsimile machine 1 makes access to a Web server 21 in accordance with periodical subscription setting information registered in the facsimile machine 1 in order to obtain and print a desired Web page.

The facsimile machine 1 includes a line control unit 3 and a communication module 5. The line control unit 3 includes an external port 4 (FIG. 2), which is connected with an analog line L1 (a telephone line of 2-wire cord or 4-wire cord) that is connected to a telephone port of a splitter 8 installed inside buildings, such as houses and offices.

Figure 2:
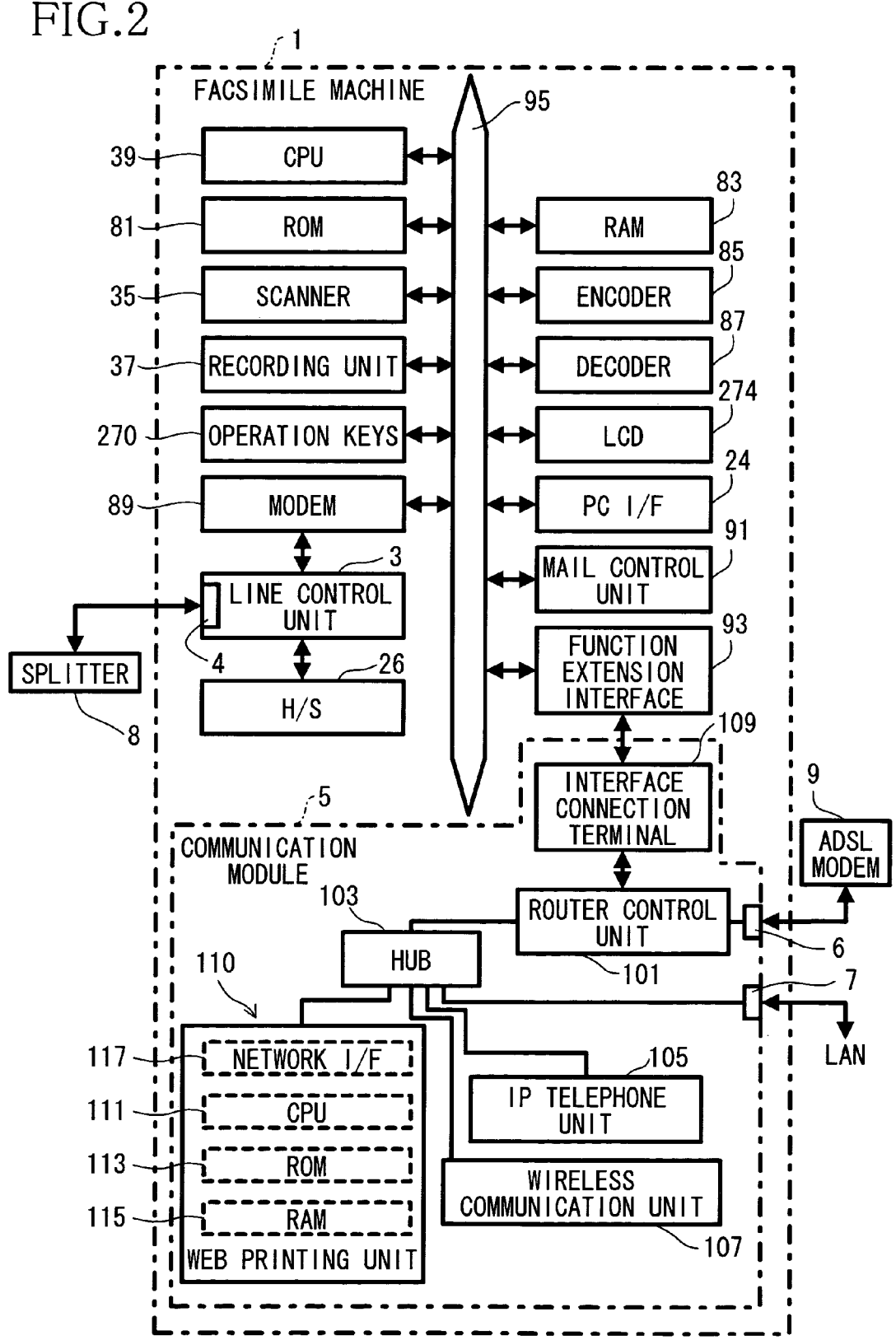
FIG. 2 is a block diagram showing the schematic structure of a facsimile machine of the embodiment.

The communication module 5 includes a WAN port 6 and a LAN port 7 (FIG. 2). The WAN port 6 is connected with a LAN cable L3 that is connected to an ADSL modem 9 connecting with an ADSL modem port of the splitter 8 via a LAN cable L2. The LAN port 7 is connected with a hub 11.

The hub 11 is connected to various LAN terminals, for example, bidirectionally communicable PCs 13, 14, a network printer (such as an ink-jet printer or a laser-beam printer) 16, an IP (Internet Protocol) telephone 15 that can send and receive voice signals in an IP system, and an Internet facsimile machine 17. That is, the hub 11 is connected with a local-area network (LAN) constructed by the LAN terminals 13 to 17 installed in a building.

The splitter 8 is a well-known splitter used for an ADSL (asymmetric digital subscriber line). The splitter separates a superimposed transmission signal into a first signal and a second signal to output the first signal and the second signal to the telephone port and the ADSL modem port, respectively. The first signal is a signal of a maximum of about 4 kHz, which is transmitted from a splitter 19 installed in a base station. The second signal is a signal for ADSL, having a higher frequency than the first signal. The splitter 8 also superimposes one signal on another, which are inputted from the telephone port and the ADSL modem port, and transmits the superimposed signal to the splitter 19 in the base station.

That is, the facsimile machine 1 of the embodiment can connect subscriber telephones in public switched telephone networks (PSTN) by using the line control unit 3. In addition, the facsimile machine 1 can connect to the Internet, such as a WAN (wide-area network), via the communication module 5 and the ADSL modem 9.

The facsimile machine 1 also serves as a router that routes data (IP packet) to be transmitted and received between a communication device (e.g. a WWW server) on the Internet and the LAN terminals 13 to 17 on the LAN, in accordance with control executed by a router control unit 101 of the communication module 5.

The facsimile machine 1 of the embodiment has a print function and a copy function as well as a common facsimile function of optically reading an image from a document, converting image data representing the image into facsimile data, sending the facsimile data via the analog line L1 to an external facsimile machine 23 connected to a public network, receiving facsimile data transmitted from the external facsimile machine 23 through the public network and the analog line L1, and forming an image on a recording sheet according to the received facsimile data.

The printing function refers to a function of forming an image onto a recording sheet according to code data transmitted from the PC 13 or 14 or a word processor. Upon receipt of code data from an external PC via a PC interface (I/F) 24 or from the PC 13 or 14 on the LAN via the communication module 5, the facsimile machine 1 forms an image onto a recording sheet according to the data. The copy function refers to a function of making a copy of an image on a recording sheet according to image data read from a document by a scanning unit 35 and a recording unit 37. Although not shown in the drawings, the facsimile machine 1 of the embodiment is equipped with a sheet tray for accommodating a plurality of recording sheets therein as recording mediums.

Next, an electronic configuration of the facsimile machine 1 will be described. As shown in FIG. 2, the facsimile machine 1 includes a CPU 39, a ROM 81, a RAM 83, the scanning unit 35, an encoder 85, the recording unit 37, a decoder 87, operation keys 270, an LCD (liquid crystal display) 274, a modem 89, the line control unit 3, the PC interface (PC I/F) 24, a mail control unit 91, a function extension interface (I/F) 93, and a handset (H/S) 26, which are connected with each other via a bus 95. The function extension interface 93 is connected with the communication module 5.

The CPU 39 is a brain of the facsimile machine 1 and executes centralized control of the facsimile machine 1. For example, the CPU 39, reads a control program from the ROM 81 to execute a facsimile data transmitting/receiving operation and a receiver data registering operation in accordance with the control program.

The ROM 81 stores a facsimile function program group (details will be omitted). More specifically, for example, the ROM 81 stores a data receiving program for forming an image by the recording unit 37 according to the facsimile data received by the line control unit 3 through the external facsimile machine 23, as the facsimile function program.

In addition, the ROM 81 stores a print function program group to permit the facsimile machine 1 to operate as a printer that prints data transmitted from a PC. More specifically, for example, the ROM 81 stores a PC print program for forming an image by the recording unit 37 according to data, which is received by the communication module 5 from the PC 13 or 14 on the LAN.

The RAM 83 serves as a working memory to be used when various controls are executed, a data storage area for storing facsimile data and a receiver's data regarding a destination of facsimile data. The scanning unit 35 scans and reads a document in order to transmit facsimile data or to make a copy of the document. The scanning unit 35 is supplied with a document from a document tray (not shown), reads an image from the document by a scanner (not shown), and outputs image data of the scan result to the encoder 85.

The encoder 85 performs an encoding operation to convert image data read by the scanning unit 35 into encoded image data in G3 format (facsimile format) and then outputs the image data. The decoder 87 decodes the image data in the facsimile format to convert the data into image data processible in the recording unit 37.

The recording unit 37 functions as a so-called color laser-beam printer that can form an image in color onto a recording unit, as described above. The recording unit 37 prints a color image onto a recording sheet by an image forming device (not shown) according to image data decoded by the decoder 87 and outputs the recording sheet having the image thereon after the printing operation is completed, in accordance with instructions provided from the CPU 39 that runs the recording unit control program.

The operation keys 270 input a command signal into the CPU 39 to perform various operations, such as registration of a receiver's data, assignment of receivers, input and selection of notes data, and input of various data necessary to obtain a Web page by connecting to the Internet. More specifically, the operation keys 270 include numeric keys and character/letter keys for inputting telephone (facsimile) numbers and URLs, a start key, and selecting keys.

The LCD 274, as a display unit, displays various messages that show operating procedures and to inform errors to the user. A Web browser is built in (installed) in the facsimile machine 1 (more specifically, the Web printing unit 110). The LCD 274 displays a browser screen when the Web browser is booted up, and various Web pages obtained from the Web server 21. The LCD 274 also functions as a touch-sensitive panel in order to display one-touch keys thereon when performing the assignment of a receiver of facsimile data and receiver's data, and obtains and inputs instructions given by the user into the facsimile machine 1.

The modem 89 is provided so that the line control unit 3 can transmit and receive facsimile data to and from the external facsimile machine 23 connected to the public network, via the splitter 8. The line control unit 3 sends a dial signal to the public network and answers a ringing signal from the public network. For example, the line control unit 3 allows the communication device 1 to be communicable with the external facsimile machine 23.

The PC interface 24 is used to connect a PC and the facsimile machine 1 via a parallel interface so that the facsimile machine 1 can receive code data from the PC 13 or 14.

The mail control unit 91 realizes transmitting and receiving of facsimile data using electronic mail by transmitting and receiving electronic mail to and from an external communication device connected to the Internet.

That is, the mail control unit 91 converts binary image data in a facsimile format, which is encoded by the encoder 85, into image data in a text code. In addition, by adding header data including, for example, an mail address of a transmitter to the image data, the mail control unit 91 converts image data in the facsimile format into image data in an electronic mail format transmittable as an e-mail and converts image data in the electronic mail format received via the communication module 5 through the Internet into image data in the facsimile format. The image data whose format was changed to the facsimile format by the mail control unit 91 is decoded to image data by the decoder 87 and then printed on a recording sheet.

The function extension interface 93 is a serial interface, such as AIO (analog input and output) or RS232C, that can detachably connected with the communication module 5, which includes the separate-type router control unit 101. The communication module 5 is provided in the body case 25 of the facsimile machine 1.

The communication module 5 includes the router control unit 101, the hub 103, an IP telephone unit 105, a wireless communication unit 107, a Web printing unit 110, and an interface connection terminal 109 which connects with the router control unit 101. The communication module 5 is connected with the function extension interface 93 via the interface connection terminal 109.

The router control unit 101, which functions as a broadband router having a well-known IP Masquerade (Network Address Port Translation) function and a routing function, transmits and receives IP packets, via the ADSL modem 9, to and from a communication device on the Internet.

That is, the router control unit 101 mutually translates (i.e., disguises) a private IP address and a port number used in the LAN, and a global IP address and a port number used in the WAN (the Internet in this embodiment) by the IP Masquerade function, therebetween. In addition, the router control unit 101 bidirectionally communicably connects the terminals 13 to 17 on the LAN with a communication device on the WAN (Web server 21) by the routing function.

For example, the router control unit 101 bidirectionally communicably connects the IP telephone unit 105, the wireless communication unit 107, and the Web printing unit 110 with the Internet, via the ADSL modem 9, by transmitting and receiving data to and from the IP telephone unit 105, the wireless communication unit 107, and the Web printing unit 110 via the hub 103.

Further, the router control unit 101 bidirectionally communicably connects the LAN terminals 13 to 17 with the Internet by performing communication with the LAN terminals 13 to 17 on the LAN connected with the LAN port 7 via the hub 103. That is, for example, the router control unit 101 provides routing and then transmits data, which is received from the Web server 21 on the Internet, to the addressed LAN terminals 13 to 17. Accordingly, the router control unit 101 functions as a routing unit and a transit unit of the invention. The router control unit 101 stores programs for embodying the above functions. A CPU of the router control unit 101 realizes the above functions by executing the appropriate programs.

The router control unit 101 can conduct communication with the CPU 39 of the facsimile machine 1 via the function extension interface 93. That is, the LAN terminals 13 to 17, the IP telephone unit 105, the wireless communication unit 107, and the Web printing unit 110 can bidirectionally communicate with the CPU 39 of the facsimile machine via the router control unit 101 and the function extension interface 93. For example, upon receipt of code data for printing from the PC 13 or 14 on the LAN through the router control unit 101, the CPU 39 of the communication device runs the print function program to form an image based on the received data.

The IP telephone unit 105, which is connected with the router control unit 101 via the hub 103, contains a voice signal into an IP packet and conducts voice communication (telephone conversation) with an external IP telephone through the Internet.

The wireless communication unit 107 conducts wireless communication between the facsimile machine 1 and an external communication device. By using a wireless connection technology, such as the Bluetooth Standard (a standard for short-range wireless communication) or the IrDA Standard (a standard for infrared wireless communication), the external wireless communication device can be bidirectionally communicably connected with each unit of the facsimile machine 1. That is, in the facsimile machine 1, the LAN terminals 13 to 17 can be connected with the facsimile machine 1 by using a cable via the LAN port 7 connected to the hub 103. By using the wireless communication unit 107, the LAN terminals 13 to 17 can be connected with the facsimile machine 1 without cable or wires.

The Web printing unit 110 includes a CPU 111, a ROM 113, a RAM 115 and a network interface 117. The Web printing unit 110 connects itself with the Internet and communicates with the CPU 39 of the facsimile machine 1 by performing communication with the router control unit 101 via the network interface 117.

The RAM 115 of the Web printing unit 110 is used as a work memory, a transmitting/receiving data memory for storing data downloaded from the Web server 21, and a subscription data registration memory for storing the subscription information entry table.

As shown in FIG. 3, in the subscription information entry table stored in the RAM 115, periodical subscription setting information (which corresponds to page obtaining data of the invention), which includes a day (a specified date or day) for obtaining a Web page by accessing the Web server 21, a time for obtaining the Web page and a URL indicating the location of the Web page to be obtained, and subscriber data indicating a LAN terminal which has made a request for the entry of the periodical subscription setting information, are specified.

As described in detail later, when the Web browser of a LAN terminal (e.g. the PC 13) transmits a setting request to sign up a periodical subscription, the CPU 117 of the Web printing unit 110 enters necessary data in the subscription information entry table in the RAM 115, based on periodical subscription setting data transmitted from the Web server 21 in response to the setting request. By performing Web page periodical subscription processing (FIG. 14) by the CPU 111 in accordance with the entered data in the subscription information entry table, the Web browser (stored in the CPU 111) built-in the Web printing unit 110 accesses a specified URL of the subscription to obtain a desired Web page. Then, the obtained Web page is actually printed onto a recording sheet.

The ROM 113 of the Web printing unit 110 stores various programs for obtaining a Web page (HTML data) from the Web server 21, printing the obtained data onto a recording sheet supplied in the facsimile machine 1, and making the setting of periodical subscription setting information in the subscription information entry table, based on the periodical subscription setting data, when the authorized periodical subscription setting data is received by the router control unit 101 from the Web server 21 and then further transmitted to the Web printing unit 110 from the router control unit 101.

Next, a flow from the sign-up of a periodical subscription of a Web page by using a LAN terminal (e.g. the PC 13) to the setting of periodical subscription setting information necessary for the periodical subscription into the subscription information entry table in the RAM 115 will be described with reference to FIGS. 4 to 7.

It is assumed that a user has opened a Web browser of the PC 13 and is viewing various Web pages via the Internet. The user is now viewing a Web page regarding, for example, "Syuukan Tenki (weekly weather forecast)", which is distributed once a week for a person who wants to get information.

In order to distribute the Web page, "Syuukan Tenki" as requested by the user of the PC 13 (that is, the Web page is signed up for a periodical subscription"), as shown in FIG. 5A, a distribution time selecting screen needs to be displayed to allow the user to select the distribution time of the Web page, "Syuukan Tenki." In this embodiment, the user can select a desired time period from the following three options: (a) every Sunday morning, (b) every Sunday afternoon, and (c) any time (a server determines a distribution time), by using radio buttons, which is a well-known inputting method using GUI (Graphical User Interface). FIG. 5A shows the distribution time selecting screen with the option of "every Sunday morning" selected.

Upon clicking the "NEXT" button after selecting the option of "every Sunday morning" by the radio button as shown in FIG. 5A, a periodical subscription sign-up screen appears as shown in FIG. 5B, in order to confirm the user's selection. As shown in FIG. 5A, a message that urges the person who wants to subscribe the Web page (the user) to click the "OK" button is displayed on the screen.

When the user clicks the "OK" button, the Web browser transmits an HTTP request (setting request) as shown in FIG. 5B to the Web server 21. More specifically, as shown in FIG. 5C, the Web browser transmits a data packet, which includes an IP address and port number of a transmitter (source) having transmitted the HTTP request, an IP address and port number of a receiver (i.e. the Web server 21), and the request data (the setting request). (See (1) shown in FIG. 4.)

In this embodiment, it is assumed that the IP address of the transmitter having transmitted the HTTP request is A, the port number of the transmitter is 8000, the IP address of the receiver is Q and the port number of the receiver is 100. The transmitter's IP address A is a so-called private IP address, and the receiver's IP address Q is a so-called global IP address.

When the setting request (data packet) is transmitted from the PC 13, the setting request is then transmitted to the Internet (WAN) through the router control unit 101. Since, as described above, the router control unit 101 of the invention has the IP Masquerade function as well as the routing function, the router control unit 101 converts the transmitter's IP address A and the transmitter's port number 8000, both of which are included in the data packet from the PC 13, into an IP address G and a port number 4000, respectively, which are held by the router control unit 101 (that is, the facsimile machine 1), by the IP Masquerade function. This IP address G is also a global IP address.

Then, the transmitter's IP address and port number in the data packet are changed to G and 4000, respectively, and the data packet is transmitted to the Web server 21 with the information that the transmitter is the facsimile machine 1. (See (2) shown in FIG. 4.) At the conversion, the IP address A and the port number 8000 before the conversion are also stored in correspondence with the converted IP address G and port number 4000, respectively.

When receiving the setting request (data packet) from the facsimile machine 1, the Web server 21 translates the HTTP request (FIG. 5B) included in the setting request to generate periodical subscription setting data necessary for the periodical subscription of a Web page desired by the user of the PC 13. More specifically, HTML data as shown in FIG. 6A is generated. In the HTML data, the periodical subscription setting data is a portion indicated by <!-- ... -->, that is, is set in a comment tag in the HTML data.

In the periodical subscription setting data enclosed in the comment tag, the portion indicated by "URL=http://syuukantenki/" corresponds to page location data of the invention, and the portion indicated by "D=SUN=:T=09:00" corresponds to page obtaining time data of the invention. That is, it is set in the comment tag that the location of the Web page to be periodically subscribed is "http://syuukantenki" and the day and time of the subscription is "at 9 a.m. on Sundays" The HTML document except the comment tag is used to display the contents of FIG. 7 on a display screen of the PC 13, but the except is not used as the periodical subscription setting data for the Web printing function.

The HTML data including the comment tag is transmitted to the facsimile machine 1, as a data packet shown in FIG. 6B. (See (3) shown in FIG. 4.) At that time, the transmitter's IP address and port number are Q and 100, respectively, both indicating the Web server 21, and the receiver's IP address and port number are G and 4000, respectively, both indicating the facsimile machine 1. The transmitter's IP address and port number, as used when the facsimile machine 1 transmitted the setting request to the Web server 21, are used as they are for a receiver's IP address and port number when the Web server 21 transmits the periodical subscription setting data to the facsimile machine 1.

Upon receipt of an HTTP response including the periodical subscription setting data (FIG. 6A), the facsimile machine 1 (the router control unit 101) determines whether the transmitter's IP address and port number included in the received data packet exist in the conversion table. When the transmitter's IP address and port number do not exist in the conversion table, it is determined that the data was not intended by the user (subscriber) and is not in response to the setting request. As such, the received data is destroyed.

When the transmitter's IP address and port number exist in the conversion table, the data packet is accepted as authorized data and the HTML data included in the data packet is translated. Then, in accordance with the periodical subscription setting data set in the comment tag of the HTML data, the periodical subscription setting information shown in FIG. 3 is set in the subscription information entry table. At that time, in addition to the periodical subscription setting information, a subscriber (the PC 13 in this case) who signed up the subscription of the Web page of "Syuukan Tenki" is also set in the table in correspondence with the periodical subscription setting information. This correspondence can be obtained based on the IP addresses before and after the conversion is stored in the conversion table.

Figure 4:
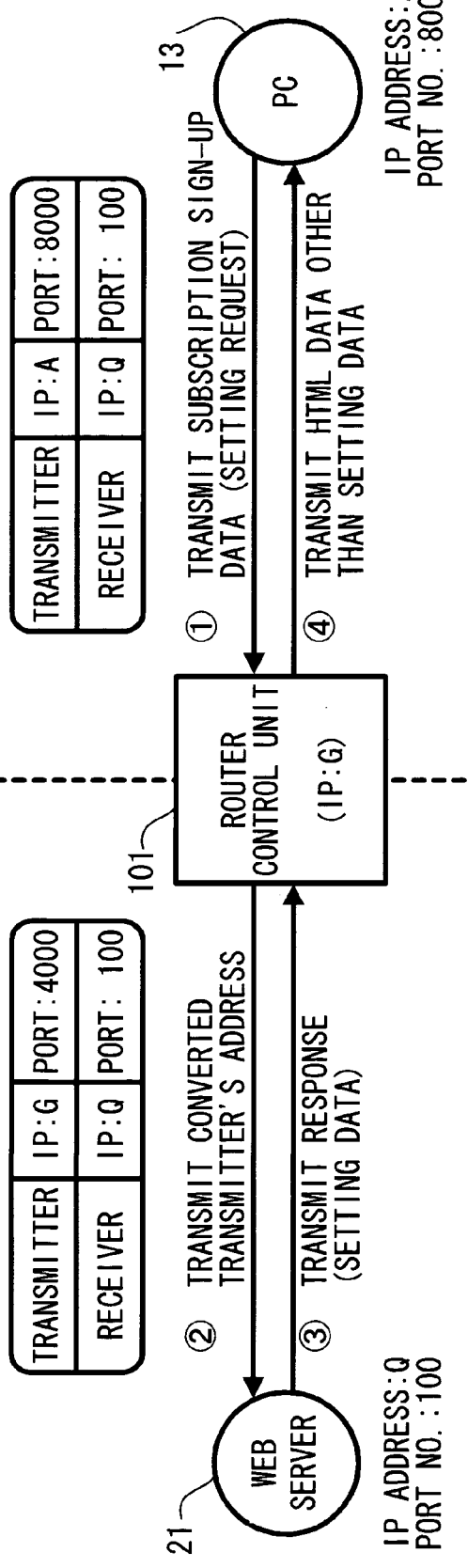
FIG. 4 is an explanatory diagram briefly showing an address conversion implemented by a router control unit when bidirectional data communications are performed between a PC and a Web server.
Figure 7:
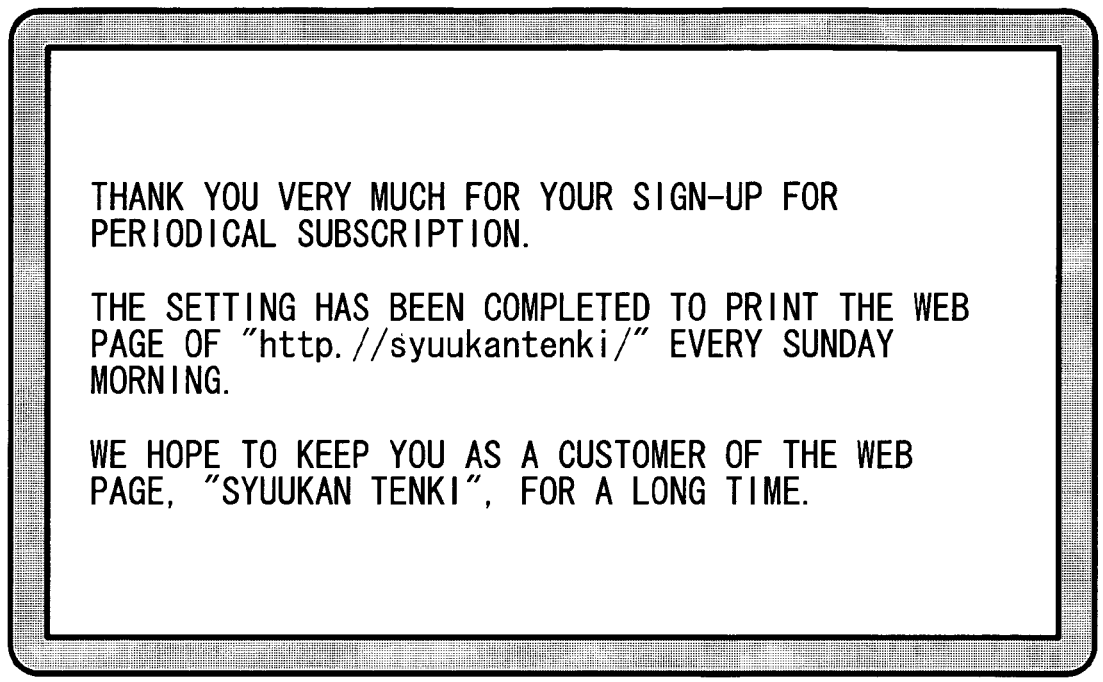
FIG. 7 shows a screen to be displayed on the display of the PC when the PC receives, from the Web server, the HTTP response including the periodical subscription setting data.

After the setting of the periodical subscription setting information is finished, the HTML data is transmitted to the PC 13 with only the comment tag (i.e. the periodical subscription setting data) being erased therefrom (See (4) shown in FIG. 4). Then, the Web browser of the PC 13 translates the HTML data without the comment tag; the web-browser displays the periodical subscription sign-up confirmation screen as shown in FIG. 7 to inform the user that the sign-up of the periodical subscription has been accepted and the setting data for the periodical subscription has been set in the facsimile machine 1.

The transmitter's IP address A and port number 8000 included in the data packet transmitted to the facsimile machine 1 corresponds to the transmitting terminal's address data of the invention. The transmitter's IP address G and port number 4000 included in the data packet transmitted to the Web server 21 corresponds to the transmitting device's address data of the invention. The receiver's IP address G and port number 4000 included in the data packet transmitted to the facsimile machine 1 correspond to receiving device's address data of the invention.

Next, terminal data transmitting processing, which is to be executed by the router control unit 101 when receiving a data packet from the PC 13, will be described with reference to FIG. 8. This processing is executed in accordance with a terminal data transmitting program stored in a ROM (not shown) in the router control unit 101 immediately after power of the facsimile machine 1 is turned on.

When this processing starts, first, at step 110 (hereinafter S stands for step), it is determined whether the router control unit 101 has received a data packet from a LAN terminal. This step is repeated until a positive judgment is made. When a positive judgment is made at S110 (S110:YES), flow moves to S120. At S120, the router control unit 101 converts a transmitter's IP address and port number included in the received data packet into an IP address and port number of the facsimile machine 1 as described above (FIG. 4).

Then, at S130, the converted data is entered in the conversion table (in the RAM (not shown) of the router control unit 101). After that, at S140, the converted data packet, that is, the data packet including the converted transmitter's IP address and port number, is transmitted to the Internet.

That is, when a data packet including an HTTP request of a setting request is transmitted from the PC 13 to the router control unit 101 by clicking the "OK" button, a transmitter's IP address A and port number 8000 in the data packet are converted into an IP address G and port number 4000 of the WAN, respectively.

Figure 9:
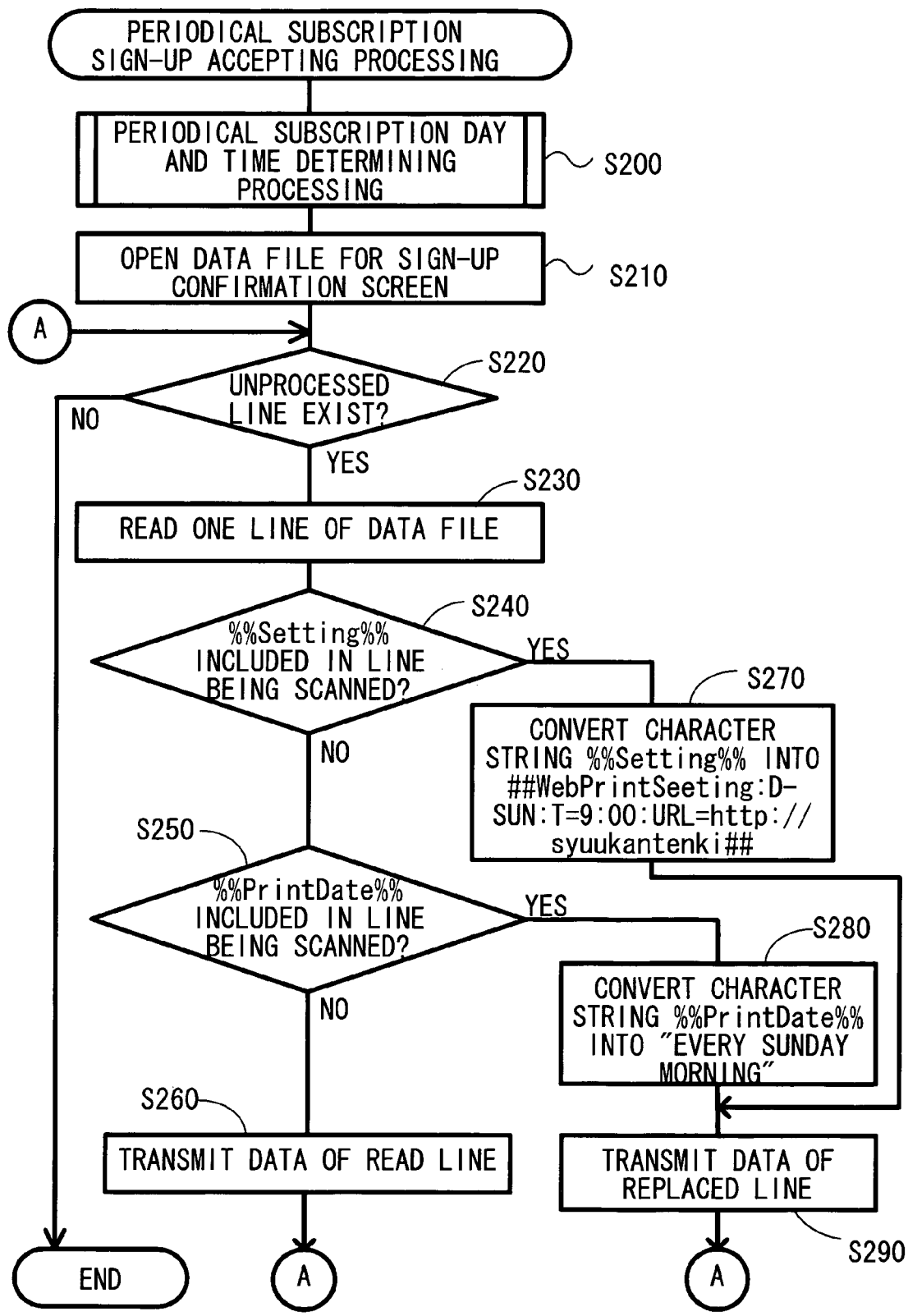
FIG. 9 is a flowchart of periodical subscription sign-up receiving processing to be performed by the Web server.
Figure 10:
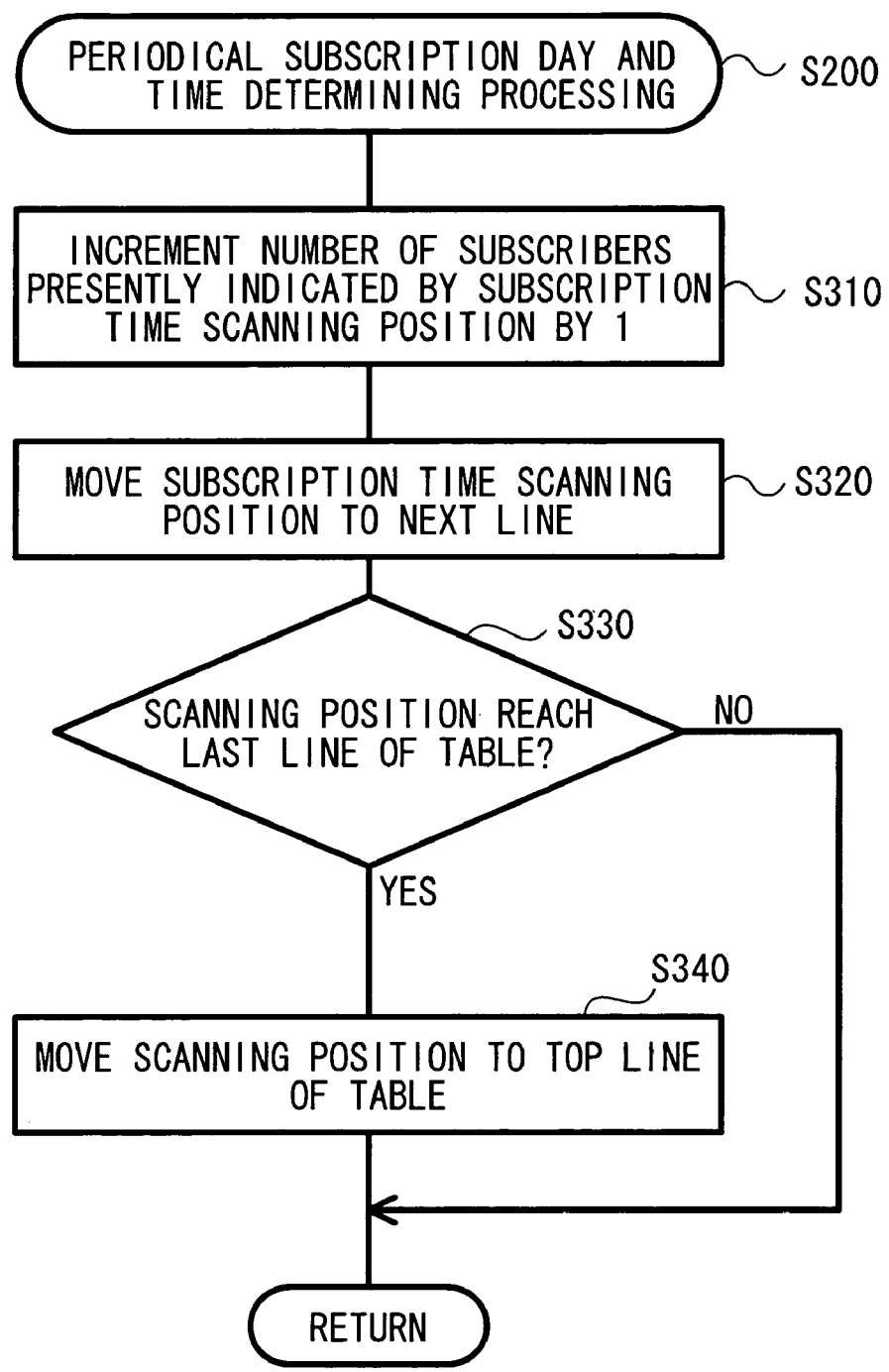
FIG. 10 is a flowchart of periodical subscription day and time determining processing to be performed by the Web server.

Next, periodical subscription sign-up accepting processing, which is to be executed by the Web server 21 when receiving the setting request from the facsimile machine 1, will be described with reference to FIG. 9. When this processing starts, at S200, periodical subscription day and time determining processing is performed. This processing is performed to set a plurality of periodical subscription times (that is, Web page access times) in different access times so that the plurality of periodical subscription times are not concentrated on the same access time. A detailed description is shown in FIG. 10.

Figure 11:
FIG. 11 shows a subscription time setting table stored in the Web server.

When the periodical subscription day and time determining processing starts (S200), at S310, in a subscription time setting table shown in FIG. 11, the number of subscribers assigned in the subscription time presently located by a current scanning position is incremented by 1. A subscription time setting table is provided for every Web page to be periodically subscripted. The subscription time setting table shown in FIG. 11 includes twelve time periods by 5 minutes from 9:00 a.m. to 9:55 a.m., for example. In FIG. 11, 123 people have already been assigned the time period of between 9:00 a.m. and 9:05 a.m. as subscribers. In the other time periods, 122 people have been assigned as subscribers. That is, for example, 123 people (123 web browsers) access the Web server at 9:00 on Sunday in order to obtain the Web page corresponding to the subscription time setting table.

When a step of S310 is performed under conditions of FIG. 11, the number of subscribers assigned the time of 9:10 is incremented by 1 to be 123 because the current scanning position locates at the line of the time of 9:10 a.m. (the third line from top).

Then, at S320, the scanning position of the subscription time is moved to a next line. In this case shown in FIG. 11, the scanning position is moved to the line of the time of 9:15 a.m.. At S330, it is determined whether the scanning position reaches a last line of the table (the line of the time of 9:55 a.m. in FIG. 11). When the scanning position has not reached the last line (S330:NO), flow goes back to S210 of the periodical subscription sign-up accepting processing (FIG. 9). When the scanning position has reached the last line (S330:YES), flow moves to S340 to return the scanning position to the first line (the line of the time of 9:00 a.m. in FIG. 11), and then goes back to S210.

That is, every time a terminal makes a request for setting data, a subscription time pointed by the current scanning position is serially scanned and transmitted to the terminal as setting data, by moving the current scanning position line-by-line. By doing so, the access time is controlled so that all of the subscribers do not access the Web server at the same time. Of course, other methods of controlling the access time are available. For example, any time period can be used. In other words, when a subscriber selects every Sunday morning, any time period between 9:00 a.m. and 11:55 a.m. can be used.

Another method of controlling the access time is to limit the number of subscribers that are assigned to a given time period. For example, a maximum of 150 people can subscribe to each time slot, i.e., 9:00 a.m., 9:05 a.m., 9:10 a.m. . . . When every Sunday morning is selected, the first 150 subscribers are assigned the time of 9:00 a.m. When the next subscriber selects every Sunday morning, that next subscriber is assigned the time of 9:05 a.m. Subscribers are assigned 9:05 a.m. until 150 subscribers have been assigned to 9:05 a.m. Thereafter, the next subscriber is assigned 9:10 a.m. This process continues until all subscribers have been assigned a time period. Of course, the assignment of additional subscribers to additional access times can be limited to 11:55 a.m. or can extend to Sunday afternoon if necessary.

After the periodical subscription day and time determining processing, at S210, a data file for a sign-up confirmation screen (HTML document) is opened (FIG. 12). The data file is initial data prestored in a Web server 21 to generate an HTTP response from the Web server 21. That is, the data file does not include data regarding a URL of a Web page and a periodical subscription as setting data. At S220 and the following steps, each processing is performed by scanning the data file, line-by-line, from the top.

At S220, it is determined whether there is a line which has not been scanned. In a case where a data file is opened for the first time, no processing is performed on the data file. Therefore, a positive judgment is made (S220:YES) and flow moves to S230. At S230, a line of the data file is scanned. That is, "<HTML>" in the first line is read and scanned first.

Then, at S240, it is determined whether the line being scanned (read at S230) includes a character string of "%%Setting%%". When the line does not include "%%Setting%%" (S240:NO), flow moves to S250. When the line includes "%%Setting%%" (S240:YES), that is, a second line is being scanned, flow moves to S270.

At S270, a character string of "%%Setting%%" in the data file is converted into "##WebPrintSetting:D=SUN=:T=09:00:URL=http://syuukanteknki/##". That is, the second line is changed to the indication shown in FIG. 6 and periodical subscription setting data has been set in the comment tag. After that, flow moves to S290 to transmit the contents of the line to the terminal as a data packet (FIG. 6B).

At S250, it is determined whether the line being scanned includes a character string of "%%PrintData%%". When the line does not includes "%%PrintData%%" (S250:NO), flow moves to S260 to transmit the contents of the line to the terminal as a data packet. When the line include "%%PrintData%%" (S250:YES), that is, when the eighth line of the data file is scanned, flow moves to S280.

At S280, the character string of "%%PrintData%%" in the data file is replaced with "every Sunday morning". That is, the eighth line is changed as shown in FIG. 6A, and thus, data to be displayed on the terminal (Web browser), which signed up the periodical subscription, is set. Then, flow moves to S290 to transmit the contents of the replaced line, as a data packet, to the terminal which signed up.

After S260 and S290, flow goes back to S220 and the above-described processing is repeatedly performed. When it is determined that a last line of "</HTML>" of the data file has been scanned, a negative judgment is made at S220 and this processing is finished.

As described above, a response (HTML), which is finally shown in FIG. 6A, is generated from the data file of FIG. 12 by executing the periodical subscription sign-up accepting processing by the Web sever 21 when the setting data for signing up periodical subscription is transmitted from the terminal. In this embodiment, an HTML document is transmitted to the terminal on a line-by-line basis.

Figure 13:
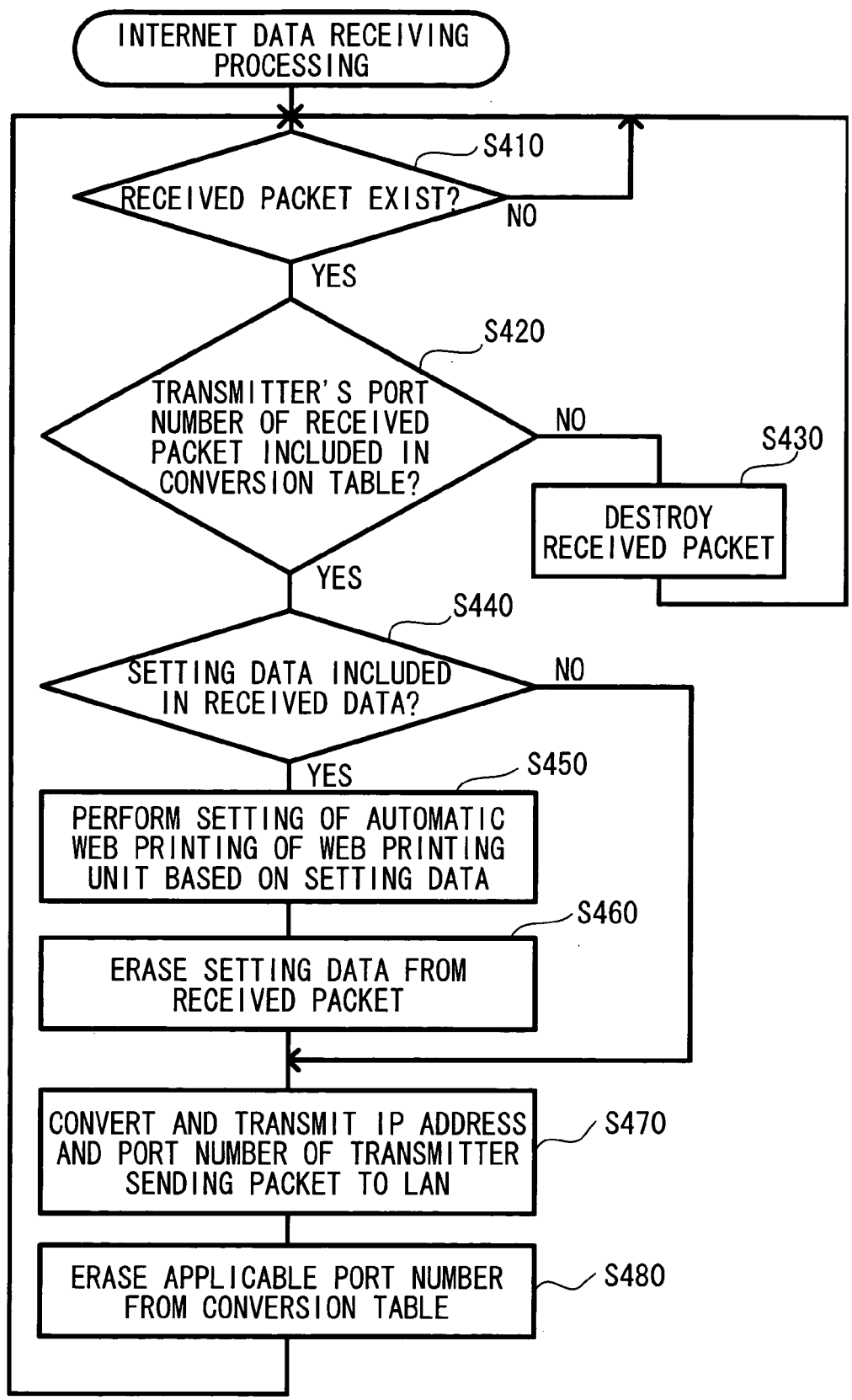
FIG. 13 is a flowchart of Internet data receiving processing to be performed by the router control unit.

Next, Internet data receiving processing to be executed by the router control unit 101 provided in the facsimile machine 1 when a data packet in HTTP format is transmitted through the WAN, will be described with reference to FIG. 13. The router control unit 101 starts this processing immediately after the power of the facsimile machine 1 is turned on.

When this processing starts, first, at S410, it is determined whether the data packet has been received through the WAN (for example, from the Web server 21). When the data packet has not been received (S410:NO), the processing of S410 is repeatedly performed until a positive judgment is made. When the data packet has been received (S410:YES), flow moves to S420 to determine whether the transmitter's port number included in the received data packet exists in the conversion table (see FIG. 4). When the transmitter's port number is not included in the conversion table, it is determined that the received data packet is data that is unintended by the user (subscriber), so that the data packet is destroyed at S430.

When the transmitter's port number is included in the conversion table, it is determined that the received data packet is authorized data to be received by the facsimile machine 1, so that flow goes to S440. At S440, it is determined whether the received data packet includes setting data (periodical subscription setting data). When a negative judgment is made (S440:NO), it is determined that the data packet is a mere HTML document, so that flow move to S470. At S470, the transmitter's IP address and port number included in the data packet are converted into the LAN terminal's IP address and port number in accordance with the conversion table to transmit the converted IP address and port number to the LAN.

When the received data packet includes the periodical subscription setting data (S440:YES), flow moves to S450 to perform a setting for automatic Web printing in the Web printing unit 110. That is, the router control unit 110 transmits the periodical subscription setting data to the Web printing unit 110. Upon receipt of the periodical subscription setting data, the Web printing unit 110 stores periodical subscription setting information in accordance with the received data, in the subscription information entry table. As described above, the subscriber (the LAN terminal which has signed up) is also stored in correspondence with the information.

Then, at S460, the periodical subscription setting data is erased from the received data packet. After that, flow moves to S470 to convert the IP address and port number and transmit them to the LAN. Then, at S480, the stored numbers of the IP address and port number are erased from the conversion table, and flow goes back to S410.

That is, when the conversion table of FIG. 4 is registered upon transmitting a setting request for periodical subscription by the PC 13, a response is sent back from the Web server 21 with respect to the setting request (periodical subscription setting data is sent) and the setting of the Web printing unit 110, that is, the setting of the subscription information entry table of FIG. 3 is completed in accordance with the response. After that, HTML data not including the periodical subscription setting data is transmitted to the LAN and then the conversion table is erased. Then, flow goes back to S410.

Figure 14:
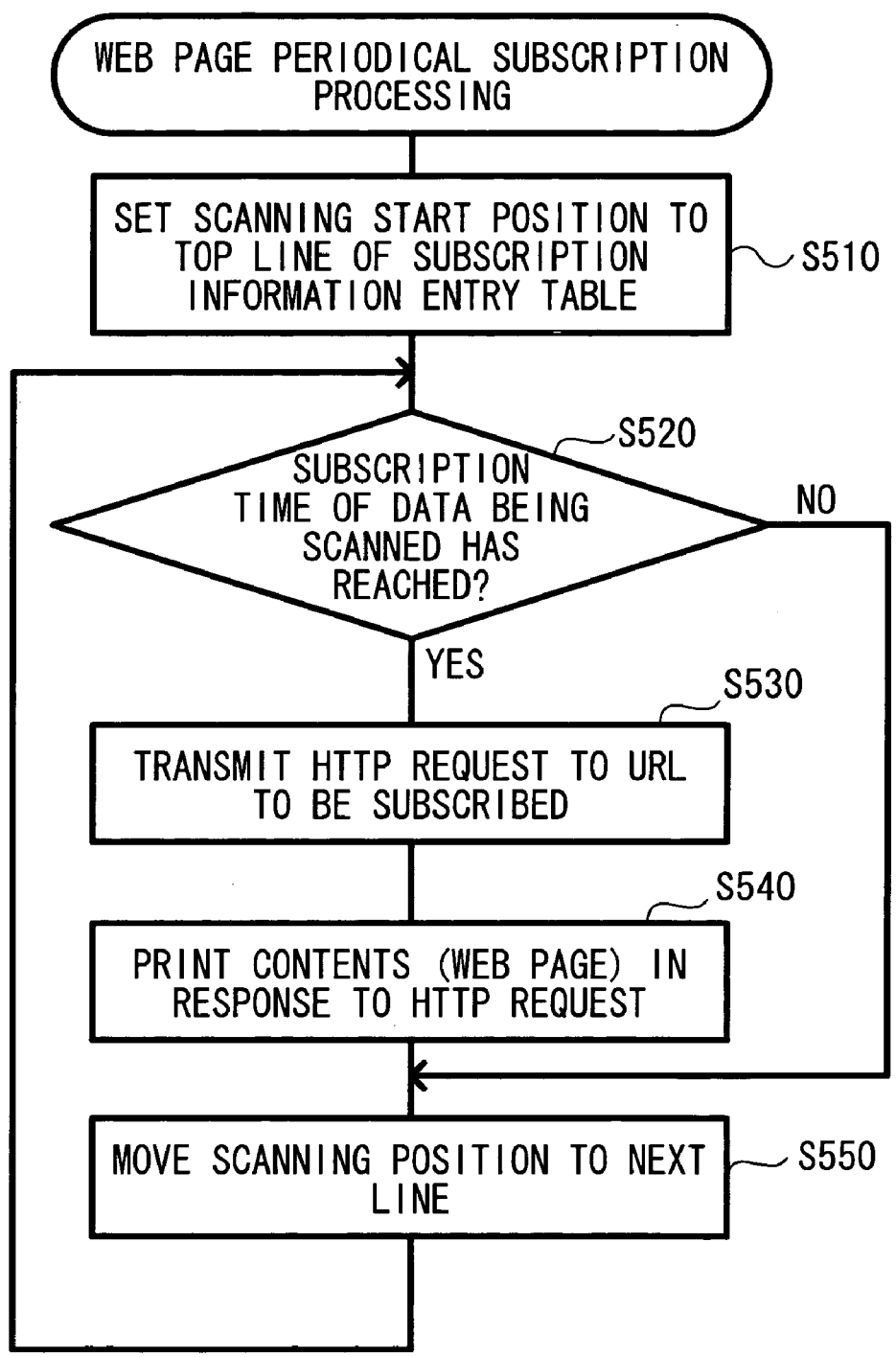
FIG. 14 is a flowchart of Web page periodical subscription processing to be performed by the Web printing unit.

Next, Web page periodical subscription processing, which is executed by the CPU 111 of the Web printing unit 110 of the facsimile machine 1 to obtain and print a Web page based on the subscription information entry table of FIG. 3, will be described with reference to FIG. 14. The CPU 111 starts this processing immediately after the power of the facsimile machine is turned on.

When this processing starts, at S510, a scanning start position is set to a first line. Then, at S520, it is determined that time has reached a subscription time (at 20:00 on Sunday in FIG. 3, for example) indicated in the data being scanned (the data in the first line). When a negative judgment is made at S520, flow moves to S550 to move the scanning start position to the next line. By positioning to the next line, the flow moves to the next request to obtain data (FIG. 3). Then, flow goes back to S520.

When a positive judgment is made at S520, flow moves to S530 to transmit an HTTP request to an URL indicated in the data being scanned in order to obtain a Web page. Then, at S540, the Web page transmitted from the Web server 21 in response to the HTTP request is printed on a recording sheet. More specifically, print data is outputted by the Web printing unit 110 and the printing is actually performed by the recording unit 37. After printing, flow moves to S550.

When the printing is performed at S540, not only the obtained Web page but also the name of the person who signed up the periodical subscription and a title of the Web page (e.g. the contents described in a title tag in the HTML data) are also printed.

Figure 15:
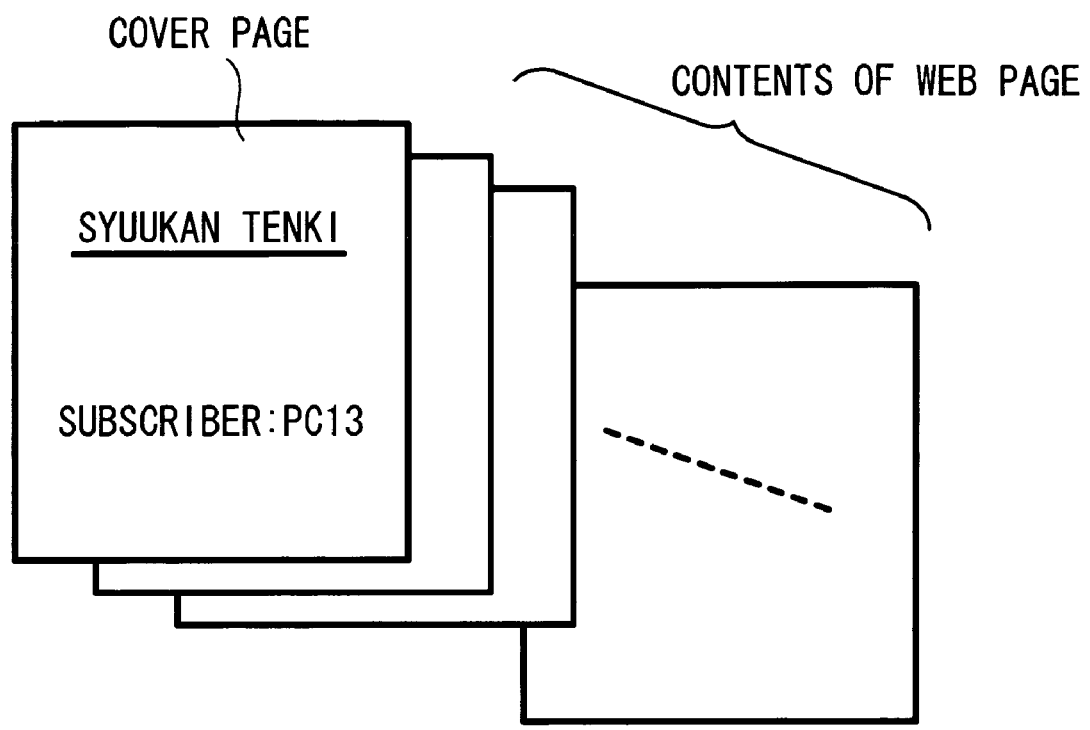
FIG. 15 is a diagram showing an example of a printed result on recording mediums by the Web printing function.

More particularly, when the predetermined Web page is obtained and printed at the predetermined subscription time (at 20:00 on Sunday) for subscribing the topmost data (http://syuukantenki. . . . ), as shown in FIG. 15, in advance of printing the contents of the Web page, "Syuukantenki" as the title and "PC 13" as the subscriber are printed on a sheet as a cover page of the Web page. By doing so, the user (subscriber) can easily find his/her output from a stack of paper by identifying the cover page. Obviously, any type of data can be printed on the cover page or identifying data can be printed on the first page thus negating the cover page.

As described above, according to the network printing system of the embodiment, the user has to sign up for a periodical subscription on the Web browser by using the LAN terminal, such as the PC 13 (to select a distribution time (FIG. 5A), and clicking the "next" button (FIG. 5A) and "OK" button (FIG. 5B)). Then, the Web server 21, which received a setting request, transmits periodical subscription data according to the request to the facsimile machine 1, and thus, the facsimile machine 1 (more specifically, the Web printing unit 110) automatically sets periodical subscription setting information by itself in accordance with the transmitted periodical subscription data. Accordingly, the setting for automatic printing by the Web printing function can be easily performed without bothering the user and can be easily performed at a (where the LAN terminals 13 to 17 are installed) distance from the facsimile machine 1. In addition, because the user can select a desired distribution time from three options in this embodiment (FIG. 5A), the user-friendly system can be embodied.

When the router control unit 101 transmits the setting request received from the LAN terminal, the transmitter's IP address and port number of the data packet including the setting request is converted into the IP address and port number of the router control unit 101 which then transmits the converted IP address and port number to the web server 21 and stores (registers) them in the conversion table. When the router control unit 101 receives a data packet that is transmitted from the WAN, the router control unit 101 determines that the data packet is authorized only when a transmitter's port number of the data packet is included in the conversion table.

Consequently, even when an outsider transmits periodical subscription setting data to the facsimile machine 1, a setting requirement (matching of the IP address) of the periodical subscription setting data does not establish (i.e., the IP address included in the same data does not match with the IP address stored in the facsimile machine 1), so that the unattended periodicals subscription data provided from the outsider can be prevented from being used to set periodical subscription setting information. That is, only the periodical subscription setting information, which is intended by the user, can be set in the facsimile machine 1.

Further, in this embodiment, when the Web printing unit 110 obtains a Web page and prints the Web page on a recording sheet by the Web printing function, a title and a subscriber of the Web page are also printed on a separate cover page, in addition to the contents of the Web page. Therefore, the user can easily identify the own output.

After the periodical subscription data is stored in the subscription information entry table, the address information corresponding to the periodical subscription setting information in the conversion table is erased. Accordingly, safety against unauthorized setting data transmitted by an outsider can be further incorporated.

In this embodiment, an access time to one Web page is controlled so that a plurality of terminals do not access the same Web page at the same time. Therefore, a load of the Web server 21 can be reduced.

In this embodiment, the facsimile machine 1 is an example of a printing apparatus of the invention. The PCs 13, 14 is an example of a communication terminal. The recording unit 37 is an example of a printing device. The Web printing unit 110 is an example of a page obtaining device. A combination of the Web printing unit 110 and the router control unit 101 is an example of a setting device. The router control unit 101 also functions as a registering device and an address data converting device.

Figure 8:
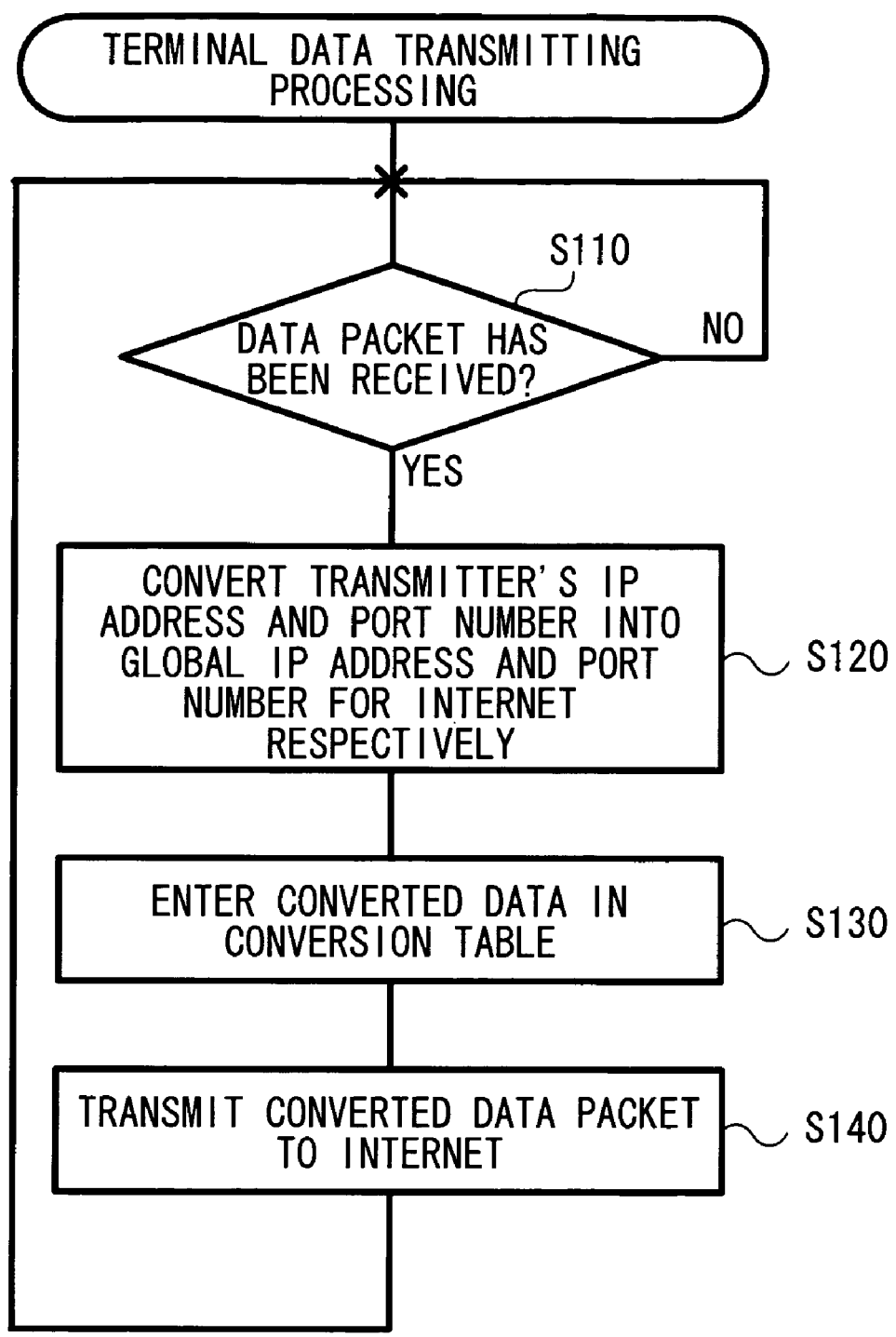
FIG. 8 is a flowchart of terminal data transmitting processing to be performed by the router control unit.

In the terminal data transmitting processing of FIG. 8, the processing of S10 and S140 is an example of the processing to be executed by the transmitting device. The processing of S120 is an example of the processing to be executed by the address data converting device. The processing of S130 is an example of the processing to be executed by the registering device. The periodical subscription sign-up accepting processing is an example of the processing to be executed by a setting data transmitting device. The processing of S270 is an example of the processing to be executed by a page location data generating unit and an obtaining time data generating unit. The processing of S260 and S290 is an example of the processing to be executed by a transmitting unit.

The subscription date and time determining processing of FIG. 10 is an example of the processing executed by the obtaining time data generating unit. In the Internet data receiving processing, the processing of S440 and S450 is an example of the processing executed by the setting device. The processing of S480 is an example of the processing executed by the registering device. The Web page periodical subscription processing of FIG. 14 is an example of the processing executed by the page obtaining device.

While the invention has been described in detail with reference to the specific embodiments thereof, it should be apparent to those skilled in the art that various changes, arrangements and modifications may be applied therein without departing from the spirit and scope of the invention.

For example, in the first embodiment, the various LAN terminals (such as PCs 13, 14) are connected to the facsimile machine 1, and when a setting request is transmitted from the PC 13 or 14, the facsimile machine 1 (the router control unit 101) receives and transmits the setting request and further transmits it to the Web server 21. The setting request is not limited to be transmitted by the LAN terminals. It can be designed such that the facsimile machine 1 itself browses a Web page on the LCD 274 by the Web browser in the Web printing unit 110, and transmits a setting request by operation of the operating keys 270 by the user in a manner similar to the way the setting request is transmitted from the PC 13 or 14.

In this case, a transmitter is the facsimile machine 1 itself, so that the transmitter's IP address and port number are not need to be converted (for example, the IP address: G, the port number: 4000). However, in this case, also, it is preferable that a step for determining whether setting data is authorized data by, for example, confirming a port number in the same manner as the second embodiment, so that periodical subscription setting information cannot be unintentionally set by an outsider.

Figure 16:
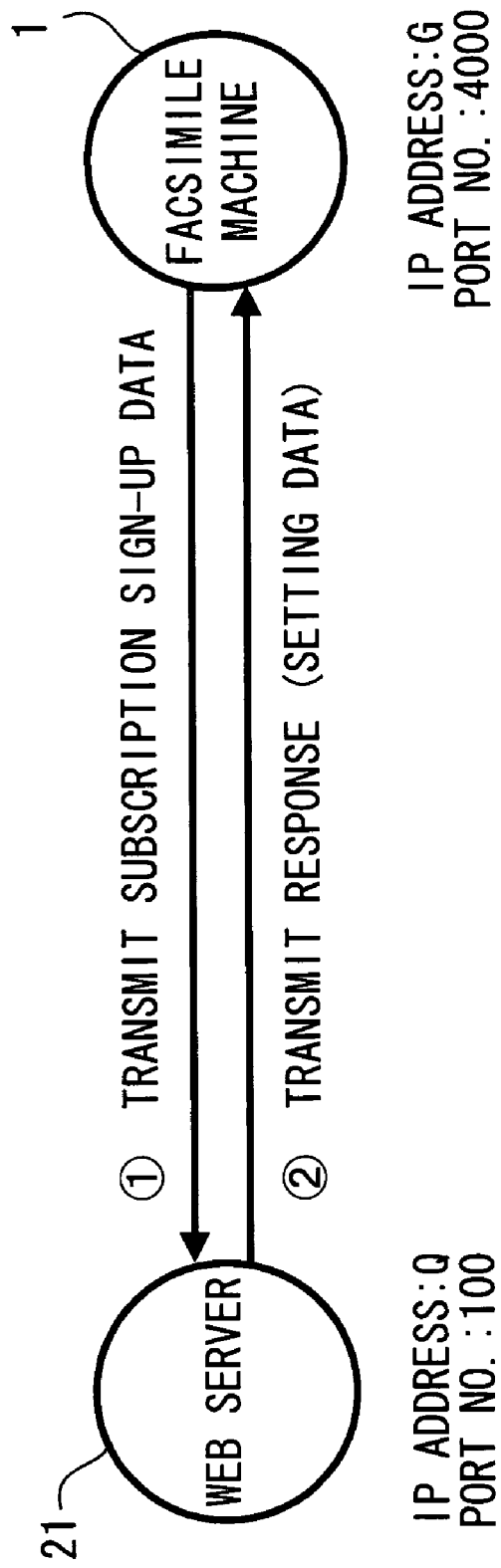
FIG. 16 is an explanatory diagram showing registration of a port number in the Web printing unit when the facsimile machine transmits a setting request to the Web server.

More particularly, for example, as shown in FIG. 16, when the facsimile machine 1 itself transmits a setting request to the web server 21, a port number storage table is separately provided in the RAM 113 of the Web printing unit 110 to store a transmitter's port number (4000 in FIG. 16) included in a transmitted data packet including the setting request. When receiving the data packet, the Web server 21 transmits the transmitter's port number 4000, as it is, to the facsimile machine 1 by a data packet of an HTTP response with respect to the setting request.

The facsimile machine 1 which received the HTTP response compares the port number included in the received data packet and the port number stored in the table. When the port number of the received data packet matches with the port number stored in the table, it can be determined that the response (periodical subscription setting data) is authorized.

In this case, the transmitter's port number (4000) included in the data packet from the facsimile machine 1 corresponds to transmitter's address data. The receiver's port number (4000) included in the data packet from the Web server 21 corresponds to the server identification data. The transmission of a data packet of the setting request in the facsimile machine 1 corresponds to the processing executed by a setting request transmitting device. The entry of a transmitter's port number into the port number storage table of FIG. 16 corresponds to the processing executed by the registering device.

Further, the system in which the facsimile machine 1 itself transmits a setting request can be constructed by a facsimile machine that only has a Web printing function without a routing function. That is, for example, in the facsimile machine 1 shown in FIG. 2, a portion constituted by the router control unit 101, the hub 103, the IP telephone unit 105, the wireless communication unit 107, the WAN connection port 6 and the LAN connection port 7 can be a single LAN connection module that can be detachably attachable to the facsimile machine 1 for allowing the facsimile machine 1 to be connected to the LAN. In this case, for example, when the LAN connection module is not used, it can be designed that the Web printing function by the Web printing unit 110 can be achieved by directly connecting the Web printing unit 110 and the function expansion I/F 93.

In this case, also, the identification of the periodical subscription setting data by the port number can be conducted as shown in FIG. 16. The port number storage table is stored, for example, in the RAM 115 of the Web printing unit 101. When receiving the data packet from the WAN, the Web printing unit 110 determines whether the data packet is authorized data, in accordance with the port number stored in the port number storage table. When the data packet is authorized (that is, the received port number matches with the stored port number), periodical subscription setting information is set in accordance with the periodical subscription setting data included in the data packet. In this case, the Web printing unit 110 corresponds to the setting device of the invention.

In the above-described embodiments, the LAN terminals, such as the PC 13, or the facsimile machine 1 is connected to the Web server 21 via the Internet. However, the LAN terminals and the facsimile machine 1 can be designed so as to be connected to the Web server 21 via a network, such as Intranet or LAN, which is a network having a relatively limited range. Furthermore, any system can be used if the system allows the facsimile machine 1 to bidirectionally communicably connect the Web server 21 so as to be able to obtain a Web page from the Web server 21.

In the embodiments, the descriptions have been given to the case where a Web page is periodically obtained in accordance with the periodical subscription setting information. However, it is possible to preset an automatic printing of a limited distribution, for example.

In the embodiments, the router control unit 101 converts an IP address and port number by its IP Masquerade function. It can be designed such that a global IP address may be assigned to each LAN terminal so that the router control unit 101 provides routing without performing the address conversion. In this case, an IP address and port number of each LAN terminal are stored as they are in the facsimile machine 1, as a transmitter's address data. This data can be used to determine whether a data packet is authorized data by comparing the transmitter's address data included in the data packet from the Web server with the stored IP address. When the transmitter's address data matches the stored address, it can be determined that the data packet is an authorized data.

In the embodiments, the invention was applied to the facsimile machine 1. However, the invention can be also applied to, for example, a printer and a copying machine.

Further, in the embodiments, the descriptions have been given by using an example of the connection between the facsimile machine 1 and LAN terminals 13 to 17 by using a wire or cable. However, the facsimile machine 1 is provided with a wireless LAN function is provided so as to perform wireless communication with the LAN terminals 13 to 17.

In the embodiments, the facsimile machine 1 is connected to the Internet using the ADSL by connecting the ADSL modem 9 to the WAN port 6 of the facsimile machine 1. However, it is not limited to the ADSL. The facsimile machine 1 can be designed so as to be able to connect with any lines connectable to the Internet, such as a common telephone line, ISDN line, CATV (cable television) line, and FTTH (Fiber To The Home) line.

The Web server 21 of the invention can be realized by various methods, for example, using separated hardware. The Web server 21 can be also embodied by executing application software (program) by a computer. The Web server 21 includes programs for allowing the computer to function as units in the Web server 21 and the Web server 21 is embodied by executing the programs by the computer.

The facsimile machine 1 of the invention is realized by executing application software (program) by the computer as well as the Web server 21. That is, the facsimile machine 1 includes programs for allowing the computer to function as units in the facsimile machine 1 and the facsimile machine 1 is embodied by executing the programs by the computer.

Programs that are used to allow a computer to function as the Web server 21 or the facsimile machine 1 of the invention are stored in a computer-readable recording medium, such as a floppy disk, a magneto-optic disk, a CD-ROM, a memory card and a hard disk, and is downloaded into the computer as necessary.

What is claimed is:

1. A network printing system comprising:
   a Web server; and
   a printing apparatus that is bidirectionally communicably connected with the Web server via a network, the printing apparatus including:
      a printing unit that prints a Web page obtained from the Web server onto a recording medium;
      a memory; and
      a controller configured to:
         transmit, according to a user's request, a setting request including identification data and requesting setting data, to the Web server;
         store the identification data in the memory;
         receive a Web page, to which subscription setting data is attached, transmitted directly from the Web server corresponding to the setting request;
         determine whether or not the subscription setting data is attached to the Web page received from the Web server;
         determine whether attached data received with the subscription setting data is the same as the identification data transmitted to the Web server by comparing the attached data to the identification data stored in the memory;

perform a setting of page obtaining data in accordance with the subscription setting data received from the Web server if the attached data received with the subscription setting data is determined to be the same as the identification data transmitted to the Web server; and recognize the Web page received from the Web server as a normal Web page without performing the setting of page obtaining data if the subscription setting data is not attached to the Web page, wherein the printing unit directly obtains the Web page to be printed from the Web server based on the page obtaining data preset in accordance with the subscription setting data received from the Web server; and wherein the setting request transmitted from the printing apparatus includes an address of the printing apparatus, an address of the Web server and the page obtaining data that identifies a location of the Web page and a time in which the Web page is to be printed.

2. The network printing system of claim 1, wherein the address of the printing apparatus is converted to a second address and only the second address is transmitted to the Web server.

3. The network printing system of claim 2, wherein the address of the printing apparatus is a private address and the second address is a global address.

4. The network printing system of claim 2, wherein the subscription setting data is transmitted from the Web server to the printing apparatus when a forwarding address of the printing apparatus in the subscription setting data matches the second address.

5. The network printing system according to claim 4, wherein the address of the printing apparatus corresponding to the setting request is erased when the printing apparatus receives the page obtaining data.

6. The network printing system of claim 1, comprising:
a router that receives the setting request from the printing apparatus and sends the setting request to the Web server.

7. The network printing system of claim 6, wherein the router disguises a location of the printing apparatus before the setting request is sent to the Web server.

8. The network printing system of claim 7, wherein the subscription setting data is transmitted from the Web server to the printing apparatus when a forwarding address of the printing apparatus in the subscription setting data matches the second address.

9. The network printing system of claim 8, wherein the address of the printing apparatus corresponding to the setting request is erased when the printing apparatus receives the page obtaining data.

10. The network printing system of claim 1, wherein the page obtaining data is staggered in accordance with a demand to record a Web page.

11. The network printing system according to claim 1, wherein when the page obtaining data is set, data necessary for the printing of the Web page obtained from the Web server is obtained.

12. The network printing system according to claim 1, wherein the page obtaining data is stored in the printing apparatus.

13. A method of printing a Web page with an image forming apparatus, comprising:

sending a setting request directly from the image forming apparatus to a Web server, according to a user's request, the setting request including identification data and requesting the Web server to transmit subscription setting data to the image forming apparatus;

storing the identification data in a memory of the image forming apparatus;

receiving a Web page, to which the subscription setting data is attached, transmitted directly from the Web server corresponding to the setting request;

determining whether or not the subscription setting data is attached to the Web page received from the Web server;

determining whether attached data received with the subscription setting data is the same as the identification data transmitted to the Web server by comparing the attached data to the identification data stored in the memory;

setting page obtaining data in accordance with the subscription setting data if the attached data received with the subscription setting data is determined, in the step of determining, to be the same as the identification data transmitted to the Web server, thereby presetting the page obtaining data;

recognizing the Web page received from the Web server as a normal Web page without performing the setting of page obtaining data if the subscription setting data is not attached to the Web page;

transmitting the preset page obtaining data to the Web server;

receiving the Web page corresponding to the transmitted page obtaining data; and printing the Web page from the Web server corresponding to the transmitted page obtaining data; wherein the setting request transmitted from the image forming apparatus includes an address of the image forming apparatus, an address of the Web server and the page obtaining data that identifies a location of the Web page and a time in which the Web page is to be printed.

14. The method of claim 13, wherein the address of the image forming apparatus is converted to a second address and only the second address is transmitted to the Web server.

15. The network printing system of claim 14, wherein the address of the printing apparatus is a private address and the second address is a global address.

16. The method according to claim 14, wherein the subscription setting data is transmitted from the Web server to the image forming apparatus when a forwarding address of the image forming apparatus in the subscription setting data matches the second address.

17. The method according to claim 13, wherein the address of the image forming apparatus is disguised before the setting request is sent to the Web server.

18. The method of claim 17, wherein the subscription setting data is transmitted from the Web server to the image forming apparatus when a forwarding address of the image forming apparatus in the subscription setting data matches a disguised location of the image forming apparatus.

19. The method of claim 18, wherein the address of the image forming apparatus corresponding to the setting request is erased when the image forming apparatus receives the page obtaining data.

20. The method of claim 13, wherein the page obtaining data is staggered in accordance with a demand to record a Web page.

21. The method according to claim 13, wherein when the page obtaining data is set, data necessary for the printing of the Web page obtained from the Web server is obtained.

22. The method according to claim 13, wherein the page obtaining data is stored in the image forming apparatus.

23. A printing apparatus bidirectionally communicably connected with a Web server via a network, comprising:

- a sending device that directly sends, according to a user's request, a setting request to the Web server, the setting request including identification data and requesting the Web server to transmit subscription setting data;
- a storing device that stores the identification data in a memory;
- a receiving device that directly receives a Web page, to which the subscription setting data is attached, transmitted from the Web server corresponding to the setting request;
- a first determining device that determines whether attached data received with the subscription setting data is the same as the identification data transmitted to the Web server by comparing the attached data to the identification data stored in the memory;
- a second determining device that determines whether or not the subscription setting data is attached to the Web page received from the Web server;
- a setting device that:
  - sets predetermined page obtaining data in accordance with the subscription setting data received by the receiving device if the attached data received with the subscription setting data is determined, by the determining device, to be the same as the identification data transmitted to the Web server; and
  - recognizes the Web page received from the Web server as a normal Web page and does not perform the setting of the page obtaining data if the subscription setting data is not attached to the Web page; and
- a printing device that prints Web page data from the Web server onto a recording medium in accordance with the predetermined page obtaining data, wherein the printing device obtains the Web page data from the Web server based on the page obtaining data preset in accordance with the subscription setting data received from the Web server; and wherein the setting request transmitted from the printing apparatus includes an address of the printing apparatus, an address of the Web server and the page obtaining data that identifies a location of the Web page and a time in which the Web page is to be printed.

* * * * *